United States Patent [19]

Tarumizu et al.

[11] Patent Number: 4,770,470
[45] Date of Patent: Sep. 13, 1988

[54] BRAKE CIRCUIT SYSTEM FOR USE IN VEHICLES WITH SELECTIVELY ACTUATED RELAY VALVES AND WITH PROTECTION VALVES

[75] Inventors: Yasumasa Tarumizu; Yukio Oguma, both of Yokohama, Japan

[73] Assignee: Kabushiki Kaisha Komatsu Seisakusho, Tokyo, Japan

[21] Appl. No.: 72,182

[22] Filed: Jul. 10, 1987

Related U.S. Application Data

[63] Continuation-in-part of Ser. No. 52,144, May 18, 1987, abandoned, which is a continuation of Ser. No. 813,903, Dec. 27, 1985, abandoned.

[51] Int. Cl.⁴ .............................................. B60T 13/00
[52] U.S. Cl. ..................................... 303/6.01; 303/13; 303/52; 303/84.2
[58] Field of Search ..................... 303/6, 8–14, 303/84, 28–30, 7, 118, 50–56; 188/16, 354, 106; 137/102

[56] References Cited

U.S. PATENT DOCUMENTS

| | | | |
|---|---|---|---|
| 3,266,850 | 8/1966 | Herold | 303/52 |
| 3,278,242 | 10/1966 | Nakamura | 303/13 |
| 3,456,988 | 7/1969 | Gibbons et al. | 303/13 X |
| 3,666,324 | 5/1972 | Page et al. | 303/9 |
| 3,888,551 | 6/1975 | Neves | 303/6 R X |
| 3,901,556 | 8/1975 | Prillinger et al. | 303/13 |
| 3,957,315 | 5/1976 | Cummins et al. | 303/7 X |
| 4,002,373 | 1/1977 | Mori | 303/6 A X |
| 4,003,605 | 1/1977 | Fannin | 303/9 X |
| 4,121,873 | 10/1978 | Durling | 303/7 |
| 4,182,535 | 1/1980 | Fannin | 303/9 |
| 4,603,919 | 8/1986 | Grauel et al. | 303/52 X |
| 4,616,881 | 10/1986 | Müller et al. | 303/52 X |
| 4,673,222 | 6/1987 | Knight | 303/13 X |
| 4,685,744 | 8/1987 | Luce | 303/13 X |

*Primary Examiner*—Douglas C. Butler
*Attorney, Agent, or Firm*—Armstrong, Nikaido, Marmelstein & Kubovcik

[57] ABSTRACT

In order to apply the brake to a vehicle even if one of main air-conduits for introducing brake operating air is damaged, a brake circuit system for use in the vehicle has independent right hand and left hand main air-conduits, two front and two rear brake fluid chambers placed in the main air-conduits and connected to right and left front wheel brakes and right and left rear wheel brakes, respectively, a brake operating air reservoir divided into right and left chambers connected through the right hand and left hand air-conduits to pair of right hand front and rear brake chambers and another pair of left hand front and rear brake chambers, respectively, and two front and two rear relay valves placed in the main air-conduits, respectively. A pair of right hand front and rear relay valves and other pair of left hand front and rear relay valves are actuated to be opened and closed by the operation of right hand and left hand brake valves, respectively.

5 Claims, 4 Drawing Sheets

BRAKE CIRCUIT SYSTEM FOR USE IN VEHICLES WITH SELECTIVELY ACTUATED RELAY VALVES AND WITH PROTECTION VALVES

CROSS REFERENCE TO RELATED APPLICATION

This application is a continuation-in-part application of our application Ser. No. 52,144 filed May 18, 1987, now abandoned, which in turn is a Continuation of application Ser. No. 813,903 filed Dec. 27, 1985, now abandoned.

BACKGROUND OF THE INVENTION

1. Field of the Invention

This invention relates to a brake circuit system for use in vehicles such as dump trucks.

2. Description of the Prior Art

In order to ensure safety during running, various types of brake system have been devised and proposed for use in wheeled vehicles such as dump trucks.

There have so far been known and employed, for example, a brake system comprising two independent brake circuit systems for front left and right hand wheels and for rear left and right hand wheels, the arrangement being made such that even when one of them is damaged or malfunctions, another brake circuit system functions to enable the vehicle to be stopped, and another brake system comprising two brake circuit systems, both of which are adapted to be applied to both front and rear wheel brakes, and which are arranged such that even if one of them is damaged, the remaining circuit system functions to ensure stoppage of the vehicle, etc.

However, the former brake system whose brake circuit system is comprised of two independent brake circuit systems for front wheel brakes and for rear wheel brakes is disadvantageous in that in the event of failure of one of them, the vehicle has to be stopped with the braking force applied only on either front wheel brakes or rear wheel brakes, and as a result, the braking capacity or effect will reduce significantly. In particular, when the brake circuit system for the rear wheel brakes is damaged, fading of the front wheel brakes tends to occur when braking the vehicle, thus making it difficult to effect emergency stop of the vehicle.

Whilst, the latter brake system having two brake circuit systems each of which can be applied to the whole front and rear wheel brakes has been disadvantageous in that when the main brake circuit is damaged it becomes difficult to brake the vehicle.

SUMMARY OF THE INVENTION

The present invention has been contemplated with a view to eliminating the above-mentioned disadvantages, and has for its object to provide a brake circuit system for use in a wheeled vehicle such as, for example, a dump truck which includes a dual braking system having two main air-conduits commonly used for left and right hand front and rear wheels, respectively, wherein even if either one of the main air-conduits is damaged, the braking operation can be effectively applied to all wheels of the vehicle by the use of another main air-conduit.

Another object of the present invention is to provide a brake circuit system for use in a wheeled vehicle such as, for example, a damp truck which includes protection valves placed in the two main air-conduits, respectively, wherein even if one or both of the main air-conduits are damaged, leakage of brake operating air is automatically stopped by the action of the protection valves.

In order to achieve the foregoing objects, according to a first feature of the present invention, there is provided a brake circuit system for use in a wheeled vehicle, comprising a first pair of independent brake means for right and left front wheels; a second pair of independent brake means for right and left rear wheels; a brake operating air reservoir means having two independent air-accumulated chambers, each of which is connected through a check valve to a wet reservoir means; a first brake fluid conduit means for introducing brake fluid into the first pair of independent brake means; a second brake fluid conduit means for introducing brake fluid into the second pair of independent brake means; a pair of main air-conduit means connected between the first and second brake fluid conduit means and the two independent air-accumulated chambers of the brake operating air reservoir means, respectively; a first pair of front and rear brake fluid chamber means placed in one of the pair of main air-conduit means and adapted to supply brake fluid through the first and second brake fluid conduit means into the first and second pairs of independent brake means so as to operate the brake means when brake operating air from at least one of the two independent air-accumulated chambers is fed through at least one of the pair of main air-conduit means into the first pair of front and rear brake fluid chamber means; a second pair of front and rear brake fluid chamber means placed in the order of the pair of main air-conduit means and adapted to supply brake fluid through the first and second brake fluid conduit means into the first and second pairs of independent brake means so as to operate the brake means when brake operating air from at least the other of the two independent air-accumulated chambers is fed through at least the other of the pair of main air-conduit means into the second pair of front and rear brake fluid chamber means; a first pair of front and rear relay valve means placed in one of the pair of main air-conduit means and adapted to be opened and closed so as to conduct a supply of the brake operating air into at least the first pair of front and rear brake fluid chamber means and an interruption thereof; a second pair of front and rear relay valve means placed in the other of the pair of main air-conduit means and adapted to be opened and closed so as to conduct a supply of the brake operating air into at least the second pair of front and rear brake fluid chamber means and an interruption thereof; and a dual brake pedal means having a pair of brake valve means, each of which is placed in a pilot conduit connected between each of the two independent air-accumulated chambers and each of the first and second pairs of front and rear relay valve means and adapted to supply pilot air through the pilot conduit into each of the first and second pairs of front and rear relay valve means so as to open the relay valve means when the dual brake pedal means is operated, whereby the braking operation can be effectively applied to all wheels of the vehicle even if either one of the pair of main air-conduit means is damaged.

According to a second feature of the present invention, in the above first feature of the brake circuit system, at least one of the first and second brake fluid conduit means is formed in a dual type so as to be enable to supply therethrough brake fluid from at least either one pair of the first and second pairs of front and rear brake fluid chamber means into the first and second pairs of independent brake means when the dual brake pedal is operated.

Further, according to a third feature of the present invention, in the foregoing second feature of the brake circuit system, the pair of main air-conduit means comprise protection valve means placed therein in the vicinity of the two independent air-accumulated chambers, respectively, so as to stop a leakage of brake operating air when at least either one of the pair of main air-conduit means is damaged.

Still further, according to a fourth feature of the present invention, in the above first feature of the brake circuit system, the first brake fluid conduit means comprises two independent conduits exclusively used for the first pair of independent brake means, respectively, and the pair of main air-conduit means comprise protection valve means placed therein in the vicinity of the two independent air-accumulated chambers, respectively, so as to stop a leakage of brake operating air when at least either one of the pair of main air-conduit means is damaged, and first and second pairs of branch passages respectively connected between the respective front relay valve means and the respective front brake fluid chamber means in which their respective ones and the others are connected through double check valve means with each other, respectively, so as to be enable to supply therethrough, respectively, brake operating air front at least either one of the pair of main air-conduit means into the respective front brake chamber means.

The above and many other advantages, features and additional objects of the present invention will become manifest to those versed in the art upon making reference to the following detailed description and accompanying drawings in which preferred structural embodiments incorporating the principles of the present invention are shown by way of illustrative example.

DETAILED DESCRIPTION OF THE PREFERRED EMBODIMENTS

The present invention will be described in detail below by way of preferred embodiments with reference to the accompanying drawings.

Figure 1:
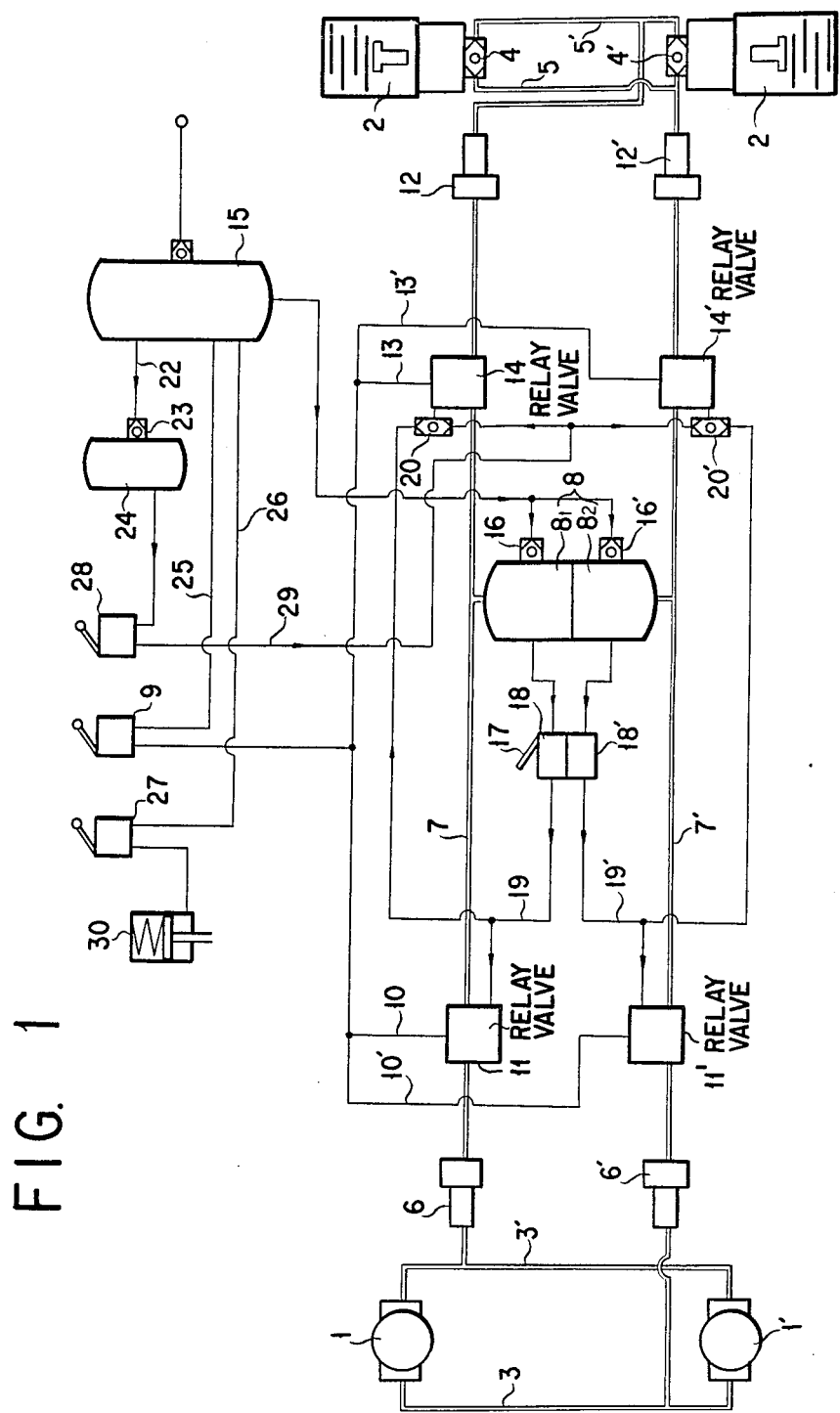
FIG. 1 is a schematical circuit diagram illustrating a first embodiment of the present invention.

In FIG. 1 showing a first embodiment of the present invention, reference numerals 1, 1' denote a pair of brakes for right and left front wheels of a construction vehicle such as, for example, a dump truck, etc. and 2, 2' a pair of brakes for right and left rear wheels, each of the right and left brakes being provided independently. Between the brakes 1, 1' for front wheels, two lines of brake fluid conduits 3, 3' are connected so as to be enable to introduce brake fluid through both or either one of the conduits 3, 3' into both the brakes 1, 1'. On the other hand, between the brakes 2, 2' for rear wheels, two lines of brake fluid conduits 5, 5' are connected through double check valves 4, 4', respectively, so as to be enable to introduce brake fluid through both or either one of the conduits 5, 5' into both the brakes 2, 2'.

The brake fluid conduits 3, 3' are connected through front brake fluid chambers 6, 6' to right hand and left hand main air-conduits 7, 7', respectively, while the brake fluid conduits 5, 5' are connected also through rear brake fluid chambers 12, 12' to the main air-conduits 7, 7', respectively.

Further, the brake circuit system of the present invention is provided with a brake operating air reservoir 8 which is divided into two independent air-accumulated chambers $8_1$ and $8_2$ connected to the main air-conduits 7 7', respectively.

In the main air-conduits 7, 7' between the brake operating air reservoir 8 and the front brake fluid chambers 6, 6', front relay valves 11, 11' are placed so as to be opened and closed by the action of pilot air pressure supplied from an emergency brake valve 9 through pilot air conduits 10 and 10', respectively. On the other hand, in the main air-conduits 7, 7' between the brake operating air reservoir 8 and the rear brake fluid chambers 12, 12', rear relay valves 14, 14' are placed so as to be opened and closed by the action of pilot air pressure supplied from the emergency brake valve 9 through pilot air conduits 13, 13', respectively.

Compressed brake operating air accumulated in a wet reservoir 15 is supplied through an air cnduit means and check valves 16 and 16' into the air-accumulated chambers $8_1$ and $8_2$, respectively, of the brake operating air reservoir 8.

The compressed air stored in each of the chambers $8_1$ and $8_2$ defined in the brake operating air-reservoir 8 is supplied, through right hand and left hand brake valves 18 and 18' which are adapted to be actuated simultaneously by operating a dual brake pedal 17, and through air-conduits 19 and 19' into the front relay valves 11 and 11', respectively, and further through double check valves 20 and 20' into the rear relay valves 14 and 14', respectively, so as to open the relay valves 11, 11', 14 and 14' to allow brake operating air from the chambers $8_1$ and $8_2$ to be supplied through the main air-conduits 7 and 7' into a pair of front and rear brake fluid chambers 6 and 12 and into another pair of front and rear brake fluid chambers 6' and 12'. As a result, the hydraulic brake fluid or oil under pressure is supplied from the brake fluid chambers 6, 6', 12 and 12' into the pair of brakes 1, 1' for front wheels and the other pair of brakes 2, 2' for rear wheels, thereby applying the brake operation to the whole front and rear wheels.

Whilst, the compressed air stored in the wet reservoir 15 is supplied through a conduit 22 and a check valve 23 into a reservoir 24, and through a conduits 25 into the emergency brake valve, and also through a conduits 26 into a parking brake valve 27. When a retarder valve 28 is opened, the compressed air supplied into the reservoir 24 flows through a conduits 29 and double check valves 20 and 20' into the relay valves 14 and 14' to open the latter to thereby enable the rear wheel brakes 2, 2' to act as a retarder. When the emergency brake valve 9 is opened, the compressed air supplied in it flows through conduits 10 and 10' into the relay valves 11, 11', 14 and 14' to thereby enable the front wheel brakes 1 and 1', and the rear wheel brakes 2 and 2' to be actuated simultaneously. When the parking brake valve 27 is opened, the compressed air supplied in it flows into a pakking brake 30 to open the latter. Further, the parking brake 30 is a negative brake which is adapted to be released when the compressed air is supplied and put under braking condition by the resilient force of a spring when the supply of compressed air is cut off.

Since the first embodiment of the present invention has been arranged as mentioned in detail hereinabove, the normal braking operation is conducted by operating the brake pedal 17 to open the brake valves 18 and 18' to thereby open the simultaneously relay valves 11, 11', 14 and 14' associated with the main air-conduits 7 and 7'. Even when either one of the main air-conduits 7 and 7' is damaged, the compressed brake operating air from the brake operating air-reservoir 8 can be supplied through the remaining main air-conduit 7' or 7 to either one of the brake fluid chambers 6, 6', so that a braking force is applied on the front wheel brakes 1, 1' and the rear wheel brakes 2 and 2' to thereby enable braking of the vehicle to be made, the vehicle can be stopped safely. Further, even when a trouble occurs in the pilot circuit, the compressed air stored in the brake operating air-reservoir 8 is supplied into the relay valves 11, 11', 14 and 14' to actuate them so as to enable the front wheel brakes 1 and 1' and rear wheel brakes 2 and 2' to be rendered operative simultaneously. Therefore, even when one of the conduits is damaged or equipment such as a valve etc. is in trouble, the vehicle can be stopped safely thereby enhancing the safety in driving vehicles.

Next, with reference to FIG. 2 a second embodiment of the present invention is hereinafter described in detail.

Figure 2:
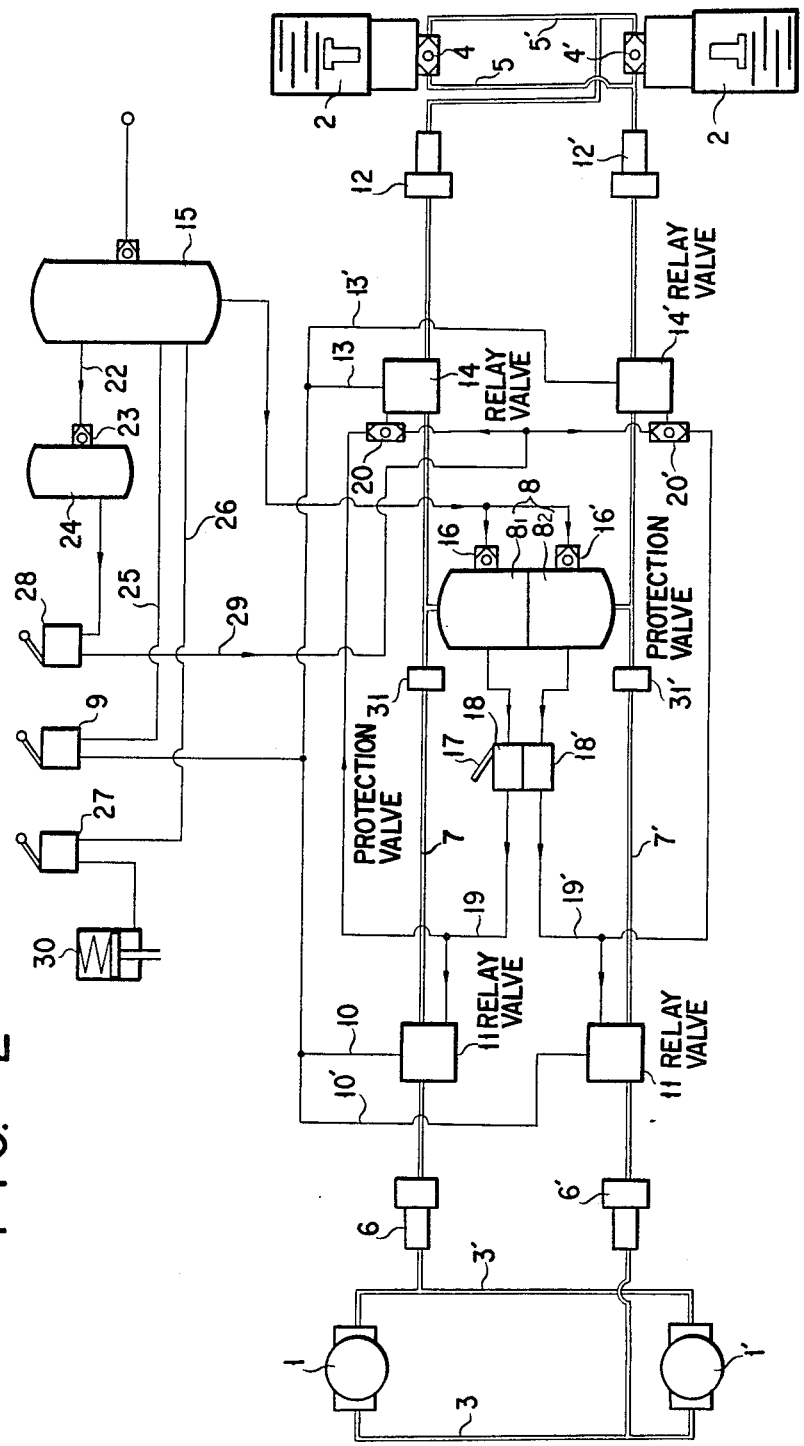
FIG. 2 is a schematical circuit diagram illustrating a second embodiment of the present invention.

The second embodiment shown in FIG. 2 has in the major part thereof the same construction and elements indicated by the same reference numerals and conducting the same functions and operations as those in the foregoing first embodiment shown in FIG. 1. Therefore, in order to avoid duplication and prolongation of the description, the explanation of those elements may be omitted in the following description.

Only a difference between the first and the second embodiments of the present invention is in that the second embodiment has protection valves 31 and 31' placed in the main air-conduits 7 and 7', respectively, interposed between the brake operating air reservoir 8 and the front relay valves 11, 11' and in the vicinity of the reservoir 8.

Figure 3:
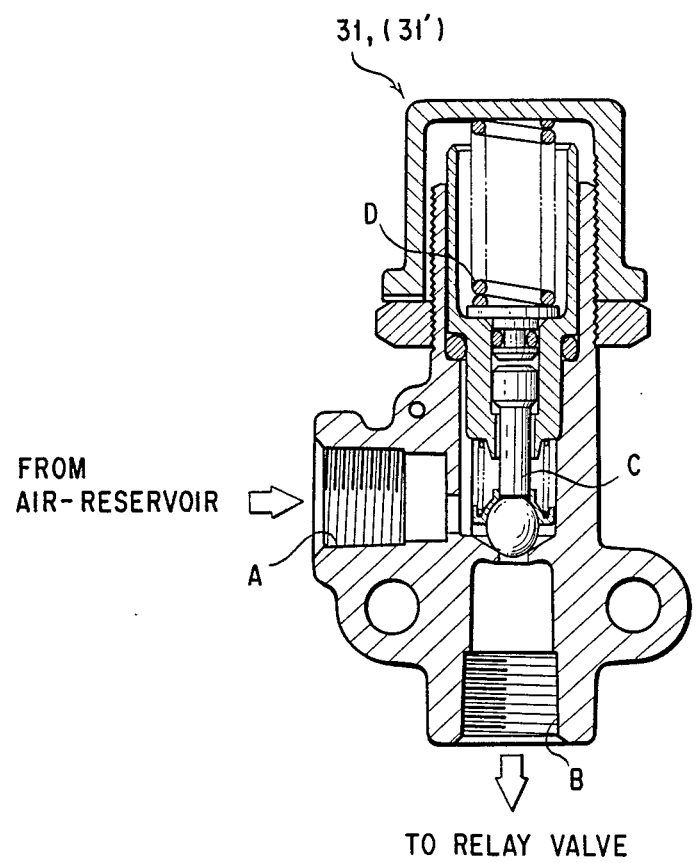
FIG. 3 is a schematical circuit diagram illustrating a third embodiment of the present invention.

Each of the protection valves 31, 31' has such a structure as shown in FIG. 3. That is, in FIG. 3, a port A is connected to a part of the main air-conduit 7 or 7' laid on the side of the brake operating air reservoir 8, while another port B is connected to a part of the main air-conduit 7 or 7' laid on the side of the front relay valve 11 or 11'. In the normal condition, since a predetermined pneumatic pressure such as, for example, 5.25 Kg/cm$^2$ or more is applied to both the ports A and B, a valve spool C is in its upward position where the lower tip thereof is spaced apart from a valve sheet so as to allow communication between the ports A and B. On the other hand, when the main air-conduit 7 or 7' laid on the side of the front relay valve 11 or 11' is damaged, the pneumatic pressure within the port B becomes low. Accordingly, the valve spool C is moved by the action of a compression spring D to its down position where the lower tip end is engaged with the valve sheet so as to interrupt the communication between the ports A and B. As a result, a leakage of brake operating air from the reservoir 8 can be stopped.

The reason why the protection valves 31, 31' are placed in the main air-conduits 7 and 7' laid on the side of the front relay valves 11, 11' is that in the construction vehicle such as, for example, a dump truck, a front under portion thereof tends to be subjected to a damage due to a hit of pebble stones spattered by the front wheels and a collision with rocks projected from the ground, as compared with the rear portion.

However, the protection valves may be further placed in the main air-conduits 7 and 7' laid on the side of the rear relay valves 14, 14' for enhancing the safety.

Figure 4:
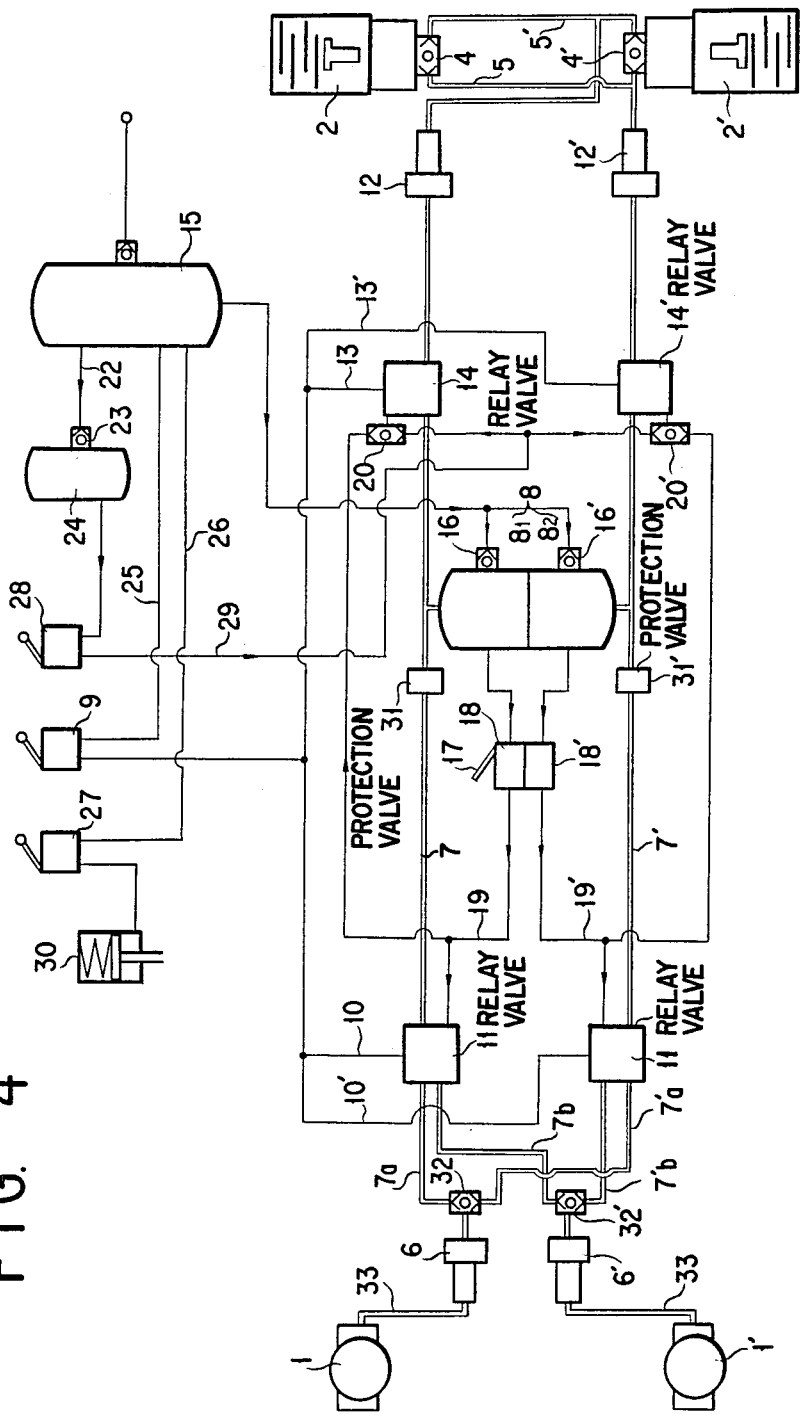
FIG. 4 is a sectional view of a protection valve used in the second and third embodiments shown in FIGS. 2 and 3.

FIG. 4 shows a third embodiment of the present invention.

The third embodiment has also in the major part thereof the same construction and elements as those in the first and the second embodiments. Therefore, in order to avoid duplication and prolongation of the description, the explanation of those elements may be also omitted in the following description.

Only a difference between the foregoing second embodiment and the third embodiment is described hereinafter.

There is the difference therebetween in a front brake part, that is, in the third embodiment the main air-conduits 7 and 7' connected between the front relay valves 11, 11' and the front brake fluid chambers 6, 6' are divided into respective two branch passages 7a, 7b and 7'a, 7'b, respectively, in which respective one of the branch passages 7a and 7'a of the main air-conduits 7 and 7' are connected through a double check valve 32 to each other, while the other branch passages 7b and 7'b of the main air-conduits 7 and 7' are connected through another double check valve 32' to each other. Thus, the first pair of connected branch passages 7a and 7'a are connected through the double check valve 32 to the front brake fluid chamber 6 which is exclusively connected through a brake fluid conduit 33 to the right hand front brake 1. On the other hand, the second pair of connected branch passages 7b and 7'b are connected through the double check valves 32' to the other front brake fluid chamber 6' which is exclusively connected through a brake fluid conduit 33' to the left hand front brake 1'.

Similarly totthe second embodiment, the protection valves 31 and 31' are placed in the main air-conduits 7 and 7', respectively.

In the third embodiments, the normal braking operation is conducted by operating the brake pedal 17 to open the brake valves 18, 18' to thereby open the simultaneously relay valves 11, 11', 14 and 14' associated with the main conduits 7 and 7' and their respective branch passages 7a, 7b, 7'a and 7'b. Further, when either one of the main air-conduits 7 and 7' and its branch passages 7a, 7b or 7'a, 7'b which are interposed between the brake operating air reservoir 8 and the front brake fluid chamber 6 or 6' are damaged, the compressed brake operating air from the reservoir 8 can be supplied through the other of the main air-conduits 7 and 7' and its branch passages 7'a, 7'b or 7a, 7b to both the front brake fluid chamber 6 and 6' so as to enable the front wheel brakes 1 and 1' to apply the braking operation to the front wheels of the vehicle, and vice versa.

It is to be understood that the foregoing description is merely illustrative of the preferred embodiments of the present invention and that the scope of the invention is not to be limited thereto. Additional modifications or alterations of the invention will readily occur to one skilled in the art without departing from the scope of the invention.

What is claimed is:

1. A brake circuit system having a wet reservoir for use in a wheeled vehicle, comprising:
    (a) a first pair of independent brake means for working on right and left front wheels;
    (b) a second pair of independent brake means for working on right and left rear wheels;
    (c) a brake operating air reservoir means for supplying compressed air and having two independent air-accumulated chambers, each of which is connected through a check valve to said wet reservoir;
    (d) a first brake fluid conduit means for introducing brake fluid into said first pair of independent brake means;
    (e) a second brake fluid conduit means for introducing brake fluid into said second pair of independent brake means;
    (f) a pair of main air-conduit means for supplying compressed air for working on said first and second brake fluid conduit means, each of said pair of main air-conduits means being connected to each of said two independent air-accumulated chambers of said brake operating air reservoir means, respectively;
    (g) a first pair of front and rear brake fluid chamber means placed in one of said pair of main air-conduit means and for supplying brake fluid through said first and second brake fluid conduit means into said first and second pairs of independent brake means so as to operate the brake means when brake operating air from at least one of said two independent air-accumulated chambers is fed through at least one of said pair of main air-conduit means into said first pair of front and rear brake fluid chamber means;
    (h) a second pair of front and rear brake fluid chamber means placed in the other of said pair of main air-conduit means and for supplying brake fluid through said first and second brake fluid conduits means into said first and second pairs of independent brake means so as to operate the brake means when brake operating air from at least the other of said two independent air-accumulated chambers is fed through at least the other of said pair of main air-conduit means into said second pair of front and rear brake fluid chamber means;
    (i) a first pair of front and rear relay valves placed in one of said pair of main air-conduit means and adapted to open and close so as to conduct a supply of the brake operating air into at least said first pair of front and rear brake fluid chamber means and an interruption thereof;
    (j) a second pair of front and rear relay valves placed in the other of said pair of main air-conduit means and adapted to open and close so as to conduct a supply of the brake operating air into at least said second pair of front and rear brake fluid chambers means and an interruption thereof;
    (k) a dual brake pedal having a pair of brake valves, each of which is placed in a pilot air-conduit connected between each of said two independent air-accumulated chambers and each of said first and second pairs of said front and rear relay valves and adapted to supply pilot air through said pilot air-conduit into each of said first and second pairs of said front and rear relay valves so as to open the relay valves when said dual brake pedal is operated;
    (l) a pair of double check valves each provided between each of said front brake fluid chamber means and said front relay valves;
    (m) a pair of protection valve each provided in each of said pair of main air-conduit means, each protection valve being adapted to work to close one of said main air-conduit means when said of one of said is damaged; and
    (n) an emergency brake valve connected to said wet reservoir and to said first and second pairs of relay valves through pilot air-conduits, wherein said relay valves are selectively actuated either by said dual brake pedal through said air-conduits or by said emergency brake valve through said pilot air-conduits and the braking operation can be effectively applied to all wheels of the vehicle even if either one of said pair of main air-conduit means is damaged.

2. A brake conduit system as claimed in claim 1, wherein at least one of said first and second brake fluid conduit means is formed in a dual type so as to enable to supply therethrough said brake fluid from at least either one pair of said first and second pairs of front and rear brake fluid chamber means into said first and second pairs of independent brake means when said dual brake pedal is operated.

3. A brake circuit system as claimed in claim 1, wherein said first brake fluid conduit means comprises two independent conduits exclusively used for said first pair of independent brake means, respectively, wherein said pair of main air-conduit means comprises said protection valves placed therein in the vicinity of said two independent air-accumulated chambers, respectively, so as to stop a leakage of brake operating air when at least either one of said pair of main air-conduit means is damaged, and first and second pairs of branch passages respectively connected between the respective front relay valves and the respective front brake fluid chamber means in which their respective ones and the others are connected through said double check valves with each other, respectively, so as to enable supply therethrough, respectively, of brake operating air from at least either one of said pair of main air-conduit means into said respective front brake fluid chamber means when said dual brake pedal is operated.

4. A brake circuit system as claimed in claim 1, further comprising a retarder valve connected through another conduit means between said wet reservoir and said respective rear relay valves.

5. A brake circuit system as claimed in claim 1, further comprising a parking brake valve connected to said wet reservoir.

* * * * *